United States Patent
Puri et al.

(10) Patent No.: US 10,542,426 B2
(45) Date of Patent: Jan. 21, 2020

(54) SYSTEM AND METHOD FOR TRANSMITTING A SECURE MESSAGE OVER A SIGNALING NETWORK

(71) Applicant: Yaana Technologies, LLC, Milpitas, CA (US)

(72) Inventors: Rajesh Puri, Fremont, CA (US); David Grootwassink, Safety Harbor, CA (US); Michael P. Hammer, Reston, VA (US)

(*) Notice: Subject to any disclaimer, the term of this patent is extended or adjusted under 35 U.S.C. 154(b) by 0 days.

(21) Appl. No.: 14/550,110

(22) Filed: Nov. 21, 2014

(65) Prior Publication Data

US 2016/0150403 A1    May 26, 2016

(51) Int. Cl.
*H04W 12/04* (2009.01)
*H04W 4/12* (2009.01)
*H04L 9/08* (2006.01)
*H04W 12/02* (2009.01)

(52) U.S. Cl.
CPC ........... *H04W 12/04* (2013.01); *H04L 9/0866* (2013.01); *H04L 9/0894* (2013.01); *H04W 4/12* (2013.01); *H04W 12/02* (2013.01); *H04L 2209/80* (2013.01)

(58) Field of Classification Search
CPC .............................. H04W 12/02; H04W 12/06
USPC ......................................................... 380/270
See application file for complete search history.

(56) References Cited

U.S. PATENT DOCUMENTS

| | | |
|---|---|---|
| 6,266,704 B1 | 7/2001 | Reed |
| 6,377,688 B1 | 4/2002 | Numao |
| 6,529,441 B1 | 3/2003 | Cummins |
| 6,574,609 B1 | 6/2003 | Downs |
| 6,765,892 B1 | 7/2004 | Leung |
| 6,785,740 B1 | 8/2004 | Yoneda |
| 6,990,352 B2 | 1/2006 | Pyhaelammi |

(Continued)

FOREIGN PATENT DOCUMENTS

| | | |
|---|---|---|
| CN | 103838593 | 6/2014 |
| CN | 104869181 | 8/2015 |

(Continued)

OTHER PUBLICATIONS

PCT International Search Report dated Jan. 28, 2016 in corresponding PCT Application No. PCT/US2015/061976 filed Nov. 20, 2015, inventors Rajesh Puri et al.

(Continued)

*Primary Examiner* — Anthony D Brown
(74) *Attorney, Agent, or Firm* — Steptoe & Johnson LLP (57) ABSTRACT

A system and method for transmitting a secure message is disclosed. According to one embodiment, a method includes providing a request for one or more attributes associated with a phone number for a recipient mobile device, generating a key based on the one or more attributes, receiving an encrypted message for a recipient mobile device, where the encrypted message is encrypted based on the key, requesting the one or more attributes from the recipient mobile device, receiving the one or more attributes from the recipient mobile device, regenerating the key based on the one or more attributes received from the recipient mobile device, decrypting the encrypted message based on the regenerated key, and delivering the decrypted message to the recipient mobile device.

28 Claims, 5 Drawing Sheets

(56) References Cited

U.S. PATENT DOCUMENTS

| | | |
|---|---|---|
| 7,082,532 B1 | 7/2006 | Vick |
| 7,146,009 B2 | 12/2006 | Andivahis |
| 7,383,433 B2 | 6/2008 | Yeager |
| 7,536,464 B1 | 5/2009 | Dommety |
| 7,561,517 B2 | 7/2009 | Klinker |
| 7,620,033 B2 | 11/2009 | Chu |
| 7,634,522 B1 | 12/2009 | Carter |
| 7,653,815 B2 | 1/2010 | Godfrey |
| 7,739,496 B2 | 6/2010 | Jacobs |
| 7,783,901 B2 | 8/2010 | Carrico |
| 7,796,760 B2 | 9/2010 | Brettle |
| 7,809,943 B2 | 10/2010 | Seidel |
| 7,849,053 B2 | 12/2010 | Vvolff Gregory J |
| 7,961,663 B2 | 6/2011 | Lin |
| 7,966,000 B2 | 6/2011 | Semple |
| 7,969,968 B2 | 6/2011 | De Luca |
| 7,991,158 B2 | 8/2011 | Narendra |
| 8,068,606 B2 | 11/2011 | Schneider |
| 8,149,994 B2 | 4/2012 | Yoon |
| 8,195,147 B2 | 6/2012 | Bonnet |
| 8,218,490 B2 | 7/2012 | Rydnell |
| 8,264,989 B2 | 9/2012 | Suzuki |
| 8,275,891 B2 | 9/2012 | Yasrebi |
| 8,295,830 B1 | 10/2012 | Faccin |
| 8,311,956 B2 | 11/2012 | Sen |
| 8,363,664 B2 | 1/2013 | Ramankutty |
| 8,417,224 B1 | 4/2013 | Young |
| 8,452,957 B2 | 5/2013 | Pourzandi |
| 8,472,384 B2 | 6/2013 | Shu |
| 8,516,244 B2 | 8/2013 | Waters |
| 8,560,835 B2 | 10/2013 | Johansson |
| 8,599,747 B1 | 12/2013 | Saleem |
| 8,634,810 B2 | 1/2014 | Barkie |
| 8,646,063 B2 | 2/2014 | Dowlatkhah |
| 8,667,182 B2 | 3/2014 | Huang |
| 8,667,570 B2 | 3/2014 | Bari |
| 8,677,148 B2 | 3/2014 | O'Hare |
| 8,713,320 B2 | 4/2014 | Xu |
| 8,738,898 B2 | 5/2014 | Herwono |
| 8,738,916 B2 | 5/2014 | Klassen |
| 8,755,342 B2 | 6/2014 | Iyer |
| 8,755,370 B1 | 6/2014 | Biswas |
| 8,755,392 B2 | 6/2014 | Traversat |
| 8,811,401 B2 | 8/2014 | Stroud |
| 8,831,227 B2 | 9/2014 | Ge |
| 8,867,339 B2 | 10/2014 | Hu |
| 8,891,407 B2 | 11/2014 | Collins |
| 8,924,574 B2 | 12/2014 | Alex |
| 8,996,854 B2 | 3/2015 | Hamalainen |
| 9,013,992 B2 | 4/2015 | Perkins |
| 9,036,540 B2 | 5/2015 | Bu |
| 9,047,107 B2 | 6/2015 | Walsh |
| 9,172,703 B2 | 10/2015 | Chaturvedi |
| 9,191,803 B2 | 11/2015 | Patel |
| 9,225,647 B2 | 12/2015 | Manuguri |
| 9,230,001 B2 | 1/2016 | Magdon-Ismail |
| 9,325,495 B2 | 4/2016 | Roberts |
| 9,379,891 B2 | 6/2016 | Yoon |
| 9,383,969 B2 | 7/2016 | Van Der Sluis |
| 9,432,258 B2 | 8/2016 | Van Der Merwe |
| 9,473,574 B2 | 10/2016 | Vandwalle |
| 9,712,421 B2 | 7/2017 | Dolson |
| 9,736,111 B2 | 8/2017 | Lopez Da Silva |
| 9,860,195 B2 | 1/2018 | Javali |
| 9,876,759 B2 | 1/2018 | Ghai |
| 2002/0156987 A1 | 10/2002 | Gajjar |
| 2002/0166056 A1* | 11/2002 | Johnson ............ G11B 20/00086 |
| | | 713/193 |
| 2003/0070070 A1 | 4/2003 | Yeager |
| 2003/0081607 A1 | 5/2003 | Kavanagh |
| 2003/0133443 A1 | 7/2003 | Klinker |
| 2003/0147536 A1 | 8/2003 | Andivahis et al. |
| 2004/0034776 A1 | 2/2004 | Fernando |
| 2004/0034778 A1 | 2/2004 | Celik |
| 2004/0042416 A1 | 3/2004 | Ngo |
| 2004/0064688 A1 | 4/2004 | Jacobs |
| 2004/0067761 A1 | 4/2004 | Pyhalammi |
| 2004/0083297 A1 | 4/2004 | Gazzetta |
| 2004/0196978 A1 | 10/2004 | Godfrey et al. |
| 2004/0213179 A1 | 10/2004 | Lundin |
| 2004/0264405 A1 | 12/2004 | MacGregor |
| 2004/0266397 A1 | 12/2004 | Smith |
| 2005/0053068 A1 | 3/2005 | Toth |
| 2005/0094651 A1 | 5/2005 | Lutz |
| 2005/0120160 A1 | 6/2005 | Plouffe |
| 2005/0259637 A1 | 11/2005 | Chu |
| 2006/0046714 A1 | 3/2006 | Kalavade |
| 2006/0059091 A1 | 3/2006 | Wang |
| 2006/0204007 A1 | 9/2006 | Doetzkies |
| 2006/0224883 A1 | 10/2006 | Khosravi |
| 2006/0236092 A1 | 10/2006 | Hamalainen |
| 2007/0006296 A1 | 1/2007 | Nakhjiri et al. |
| 2007/0087756 A1 | 4/2007 | Hoffberg |
| 2007/0100981 A1 | 5/2007 | Adamczyk |
| 2007/0156632 A1 | 7/2007 | Wolff |
| 2008/0076425 A1 | 3/2008 | Khetawat |
| 2008/0089239 A1 | 4/2008 | Todd |
| 2008/0101345 A1 | 5/2008 | Suzuki |
| 2008/0107096 A1 | 5/2008 | Huang |
| 2008/0137825 A1 | 6/2008 | Yoon |
| 2008/0155278 A1 | 6/2008 | Carrico |
| 2008/0212782 A1 | 9/2008 | Brettle et al. |
| 2008/0279381 A1 | 11/2008 | Narendra et al. |
| 2008/0285452 A1 | 11/2008 | Oran |
| 2009/0060175 A1 | 3/2009 | Schneider |
| 2009/0088147 A1 | 4/2009 | Bu |
| 2009/0259532 A1 | 10/2009 | Bergstraesser |
| 2009/0287922 A1 | 11/2009 | Herwono et al. |
| 2009/0305688 A1 | 12/2009 | Bonnet |
| 2010/0039993 A1 | 2/2010 | Ramankutty |
| 2010/0086119 A1 | 4/2010 | De Luca |
| 2010/0125855 A1 | 5/2010 | Ferwerda |
| 2010/0174907 A1 | 7/2010 | Semple |
| 2010/0246500 A1 | 9/2010 | Rydnell |
| 2011/0016399 A1 | 1/2011 | Yasrebi |
| 2011/0040706 A1 | 2/2011 | Sen |
| 2011/0040858 A1 | 2/2011 | Gum |
| 2011/0069663 A1 | 3/2011 | Shu |
| 2011/0075675 A1 | 3/2011 | Koodli |
| 2011/0141947 A1 | 6/2011 | Li |
| 2011/0154022 A1 | 6/2011 | Cheng |
| 2011/0170545 A1 | 7/2011 | Zheng |
| 2011/0182183 A1 | 7/2011 | Perkins |
| 2011/0191469 A1 | 8/2011 | Oran |
| 2011/0216646 A1 | 9/2011 | Flinta |
| 2011/0219123 A1 | 9/2011 | Yang |
| 2011/0264906 A1* | 10/2011 | Pourzandi ............ G06F 21/6218 |
| | | 713/153 |
| 2011/0268121 A1 | 11/2011 | Karino |
| 2011/0320592 A1 | 12/2011 | Kemmerer |
| 2012/0030683 A1 | 2/2012 | Kurdi |
| 2012/0084288 A1 | 4/2012 | Abdul-Razzak |
| 2012/0120788 A1 | 5/2012 | Hu |
| 2012/0191860 A1 | 7/2012 | Traversat |
| 2012/0198241 A1 | 8/2012 | O'Hare |
| 2012/0297087 A1 | 11/2012 | Humble |
| 2012/0314854 A1 | 12/2012 | Waters |
| 2012/0331298 A1 | 12/2012 | Xu et al. |
| 2013/0042112 A1* | 2/2013 | Spector ................ H04L 9/0847 |
| | | 713/171 |
| 2013/0080586 A1 | 3/2013 | Attanasio |
| 2013/0084896 A1 | 4/2013 | Barkie et al. |
| 2013/0091526 A1 | 4/2013 | Iyer |
| 2013/0128886 A1 | 5/2013 | Shah |
| 2013/0132501 A1 | 5/2013 | Vandwalle |
| 2013/0137399 A1 | 5/2013 | Bari |
| 2013/0159715 A1 | 6/2013 | Klassen |
| 2013/0160080 A1* | 6/2013 | Shin ...................... H04L 63/08 |
| | | 726/3 |
| 2013/0160097 A1 | 6/2013 | Dowlatkhah |
| 2013/0219045 A1 | 8/2013 | Agarwal |
| 2013/0250771 A1 | 9/2013 | Yu |
| 2013/0254853 A1 | 9/2013 | Chaturvedi |
| 2013/0283060 A1 | 10/2013 | Kulkarni |

(56) References Cited

U.S. PATENT DOCUMENTS

| | | |
|---|---|---|
| 2013/0301627 A1 | 11/2013 | Chen |
| 2013/0329725 A1 | 12/2013 | Nakil |
| 2013/0343388 A1 | 12/2013 | Stroud |
| 2013/0346629 A1 | 12/2013 | Wang |
| 2014/0032753 A1 | 1/2014 | Watanabe |
| 2014/0040338 A1 | 2/2014 | Van Der Sluis |
| 2014/0040975 A1 | 2/2014 | Raleigh |
| 2014/0047439 A1 | 2/2014 | Levy |
| 2014/0129728 A1 | 5/2014 | Alex |
| 2014/0181933 A1* | 6/2014 | Sanjeev ............... H04L 63/0823 726/7 |
| 2014/0192976 A1 | 7/2014 | Yoon |
| 2014/0199962 A1 | 7/2014 | Mohammed |
| 2014/0226478 A1 | 8/2014 | Manuguri |
| 2014/0241169 A1 | 8/2014 | Collins |
| 2014/0245014 A1 | 8/2014 | Tuck |
| 2014/0274000 A1 | 9/2014 | Gosselin |
| 2014/0286337 A1 | 9/2014 | Dolson |
| 2014/0301258 A1 | 10/2014 | Belghoul |
| 2014/0331175 A1 | 11/2014 | Mesguich Havilio |
| 2014/0344908 A1 | 11/2014 | Rizzo |
| 2014/0348044 A1 | 11/2014 | Narayanan |
| 2014/0355520 A1 | 12/2014 | Wallis |
| 2015/0058876 A1 | 2/2015 | Gasnier |
| 2015/0065125 A1 | 3/2015 | Patel |
| 2015/0139230 A1 | 5/2015 | Zha |
| 2015/0148007 A1 | 5/2015 | Mitchell |
| 2015/0188919 A1 | 7/2015 | Belton |
| 2015/0256338 A1 | 9/2015 | Roberts |
| 2015/0281940 A1 | 10/2015 | Yu |
| 2015/0304275 A1 | 10/2015 | Ghai |
| 2015/0372973 A1 | 12/2015 | Lopez Da Silva |
| 2016/0072766 A1 | 3/2016 | Jain |
| 2016/0359798 A1 | 12/2016 | Choquette |
| 2017/0195256 A1 | 7/2017 | Javali |
| 2017/0250944 A1 | 8/2017 | Hong |
| 2017/0373961 A1 | 12/2017 | Dolson |
| 2018/0034770 A1 | 2/2018 | Rajagopalan |

FOREIGN PATENT DOCUMENTS

| | | |
|---|---|---|
| EP | 1587249 | 10/2005 |
| EP | 1837815 | 9/2007 |
| EP | 1993257 | 11/2008 |
| WO | 2007004938 | 1/2007 |
| WO | 2009103340 | 8/2009 |
| WO | 2013035051 | 3/2013 |
| WO | 2014018425 | 1/2014 |
| WO | 2015066930 | 5/2015 |

OTHER PUBLICATIONS

Antopolis, Sophia, Interface for Warrant information Output from LI34 Q&D Li Agnostic; vol. Li no. Vo.07, Jan. 28, 2014.
International Search Report dated May 21, 2015 in corresponding PCT Application No. PCT/US2015/15490 filed Feb. 11, 2015, inventor Puri, Rajesh et al.
Antopolis, Sophia, "Lawful Interception (LI); Retained Data; Requirements of Law Enforcement Agencies for handling Retained Data", ETSI Draft; Jan. 27, 2009.
Extended European Search Report dated Feb. 16, 2018 in corresponding EP Application No. 15749222.4 filed Sep. 12, 2016, inventor Grootwassink, David et al.
Antopolis, Sophia, Universal Mobile Telecommunications System (UMTS) LTE; 3G security; Lawful Interception architecture and functions, version 10.4.0, Jun. 1, 2011.
International Search Report dated Jul. 8, 2015 in corresponding PCT Application No. PCT/US2015/016961 filed Feb. 20, 2015, inventor(s) Grootwassink, David, et al. cited by applicant.
International Search Report dated Oct. 30, 2015, issued in International Application No. PCT/US2015/023626 filed Mar. 31, 2015, inventor, Grootwassink, David et al.
International Search Report dated Feb. 2, 2016, issued in International Application No. PCT/US2015/054957 filed Oct. 9, 2015, inventor Hammer, Michael et al.
International Search Report dated Jan. 28, 2016, issued in International Application No. PCT/US2015/061976 filed Nov. 20, 2015, inventor Puri, Rajesh et al.
International Search Report dated Jun. 22, 2015, issued in International Application No. PCT/US2015/20755 filed Mar. 16, 2015, inventor Puri, Rajesh et al.
International Search Report dated Jul. 29, 2016, issued in International Application No. PCT/US2016/030311 filed Apr. 29, 2016, inventor Hammer, Michael et al.
International Search Report dated Jan. 30, 2017 in corresponding PCT Application No. PCT/US2016/061894 filed Nov. 14, 2016, inventor Puri, Rajesh et al.
International Search Report dated Feb. 3, 2017, issued in International Application No. PCT/US2016/061897 filed Nov. 14, 2016, inventor Hammer, Michael et al.
International Search Report dated Apr. 25, 2017, issued in International Application No. PCT/US2017/17560 filed Feb. 10, 2017, inventor Hammer, Michael et al.
Arnedo-Moreno et al, JXTA resource access control by means of advertisement encryption, Future Generation computer Systems 26 (2009) pp. 21-28, Elsevier.
Ford et al., Peer-to-Peer Communication Across Network Address Translators, 2005, Usenix. cited by applicant.
Supplementary European Search Report dated Feb. 5, 2018 in corresponding EP Application No. 15751839.0 filed Sep. 21, 2016, inventor Grootwassink, David et al.
"Interface for warrant information Output From LI34 Q & D LI Agnostic;LI(14)P35060_DTS_103_120_-_Output_from_LI 13_Q_D_LI_agnostic", ETSI Draft; LI(14)P35060_DTS_103_120_-_OUTPUT_From_LI_13_Q_D_LI_Agnostic, European Telecommunications Standards Institute (Etsi), 650, Route Des Lucioles ; F-06921 Sophia-Antipolis ; France, (20140128), vol. LI, No. V0.0.7, pp. 1-53, XP014161420.
Written Opinion of the International Searching Authority dated May 21, 2015, issued in International Application No. PCT/US2015/015490. cited by applicant.
Written Opinion of the International Searching Authority dated Oct. 30, 2015, issued in International Application No. PCT/US2015/023626. cited by applicant.
Written Opinion of the International Searching Authority dated Jul. 8, 2015, issued in International Application No. PCT/US2015/016961. cited by applicant.
Written Opinion of the International Searching Authority dated Feb. 2, 2016, issued in International Application No. PCT/US2015/054957. cited by applicant.
Written Opinion of the International Searching Authority dated Jan. 28, 2016, issued in International Application No. PCT/US2015/061976. cited by applicant.
Written Opinion of the International Searching Authority dated Jun. 22, 2015, issued in International Application No. PCT/US2015/020755 cited by applicant.
Written Opinion of the International Searching Authority dated Jul. 29, 2016, issued in International Application No. PCT/US2016/030311 cited by applicant.
Written Opinion of the International Searching Authority dated Jan. 30, 2017, issued in International Application No. PCT/US2016/061894 cited by applicant.
Written Opinion of the International Searching Authority dated Feb. 3, 2017, issued in International Application No. PCT/US2016/061897. cited by applicant.

* cited by examiner

SYSTEM AND METHOD FOR TRANSMITTING A SECURE MESSAGE OVER A SIGNALING NETWORK

FIELD

The present disclosure relates in general to the field of telecommunications. In particular, the present disclosure relates to a system and method for transmitting a secure message over a signaling network.

BACKGROUND

Short message service (SMS) is a communication protocol for sending a message to a mobile device. An SMS system is inherently insecure as SMS messages are transmitted in a clear text format. The clear text format refers to a message or data that is immediately understandable to a human being without cryptographic protection. The SMS system delivers an SMS message to a mobile device through a chain of one or more intermediary systems, therefore the SMS message may be intercepted and read at any point along the chain. An intermediary system may have a store and forward function to store an SMS message for an indefinite period without an expectation of data protection or privacy laws. Furthermore, the SMS system is susceptible to identity spoofing so that an SMS message may be delivered to an unauthorized mobile device.

SUMMARY

A system and method for transmitting a secure message over a signaling network is disclosed. According to one embodiment, a method includes providing a request for one or more attributes associated with a phone number for a recipient mobile device, generating a key based on the one or more attributes, receiving an encrypted message for a recipient mobile device, where the encrypted message is encrypted based on the key, requesting the one or more attributes from the recipient mobile device, receiving the one or more attributes from the recipient mobile device, regenerating the key based on the one or more attributes received from the recipient device, decrypting the encrypted message based on the regenerated key, and delivering the decrypted message to the recipient mobile device.

The above and other preferred features, including various novel details of implementation and combination of elements, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments.

BRIEF DESCRIPTION OF THE FIGURES

The accompanying figures, which are included as part of the present specification, illustrate the various embodiments of the present disclosed system and method and together with the general description given above and the detailed description of the preferred embodiments given below serve to explain and the teach the principles of the present disclosure.

It should be noted that the figures are not necessarily drawn to scale and elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method for transmitting a secure message over a signaling network is disclosed. According to one embodiment, a method includes providing a request for one or more attributes associated with a phone number for a recipient mobile device, generating a key based on the one or more attributes, receiving an encrypted message for a recipient mobile device, where the encrypted message is encrypted based on the key, requesting the one or more attributes from the recipient mobile device, receiving the one or more attributes from the recipient mobile device, regenerating the key based on the one or more attributes received from the recipient device, decrypting the encrypted message based on the regenerated key, and delivering the decrypted message to the recipient mobile device.

Each of the features and teachings disclosed herein can be utilized separately or in conjunction with other features and teachings to provide a system and method for transmitting a secure message over a signaling network. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

According to one embodiment, the present system and method transmits a secure message from a message sending system to a recipient mobile device. The message sending system may include a host server system of an enterprise and any type of computing device. For example, the message sending system is a banking website that is supported by a host system of a bank for sending a secure message to a customer. The secure message may be transmitted as an encrypted message via store-and-forward message servers (e.g., SMS system) or a packet network (e.g., the Internet) to a delivery agent that connects to a recipient mobile device over a secure signaling network (e.g., a Signaling System No. 7 (SS7) network). The delivery agent may include a server and other computing systems. For example, the delivery agent is a cluster of servers or a virtual machine. The present system and method encrypts a message to secure the content of the message between a message sending system and a recipient mobile device. The present system and method prevents a clear text message from being delivered to an unauthorized mobile device.

Key Generation

Figure 1:
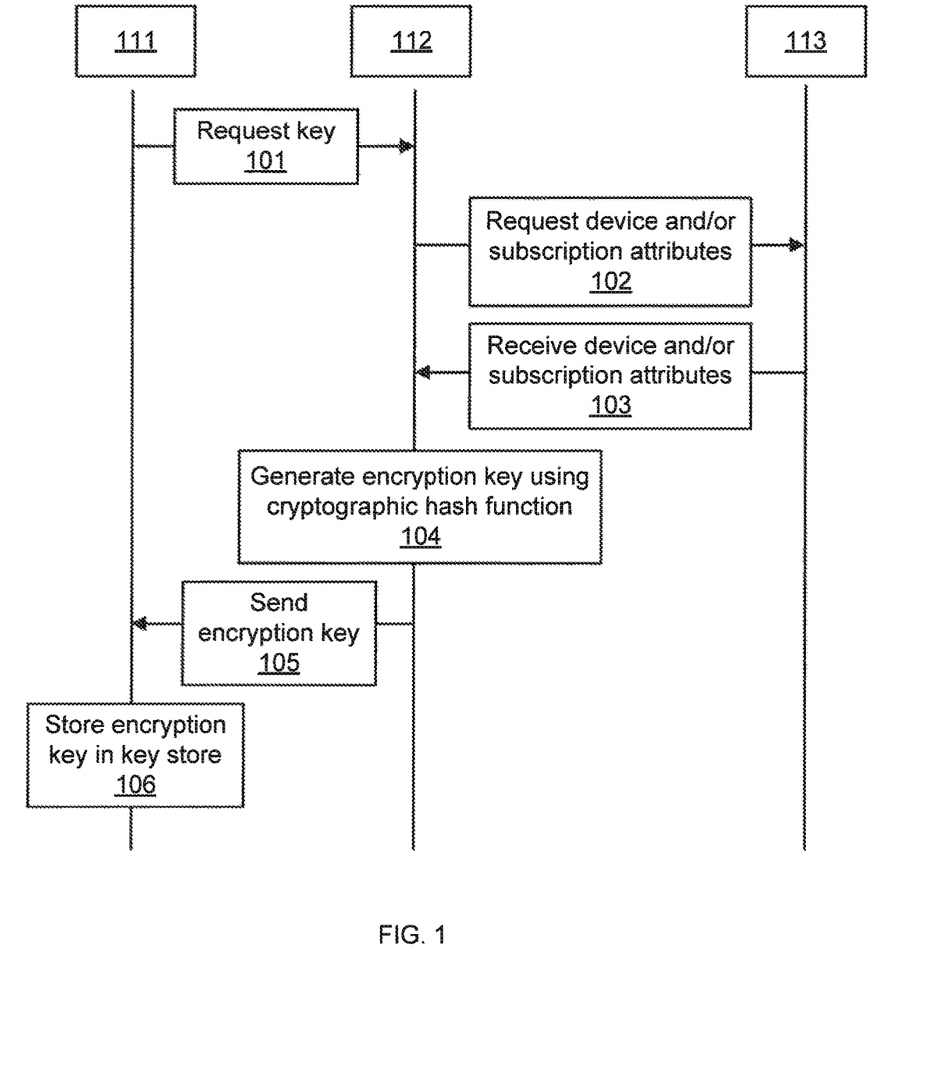
FIG. 1 illustrates an exemplary sequence for generating a key, according to one embodiment.

FIG. 1 illustrates an exemplary sequence for generating a key, according to one embodiment. A message sending system 111 initiates a key generation request by requesting a key (e.g., an encryption key) for a recipient mobile device 113 from a delivery agent 112 (at 101). The key generation request includes a recipient identifier of the recipient mobile device 113 and a sender identifier of the message sending system 111. The delivery agent 112 receives the key generation request from the message sending system 111 and sends a request to the recipient mobile device 113 for a device attribute (e.g., a mobile equipment identity such as the international mobile station equipment identity (IMEI)) and/or a service subscription attribute of the desired mobile device 113 via a control plane of the recipient mobile device 113 (at 102). For example, the service subscription attribute is a mobile subscriber identity that is an identity of a subscriber identity module (SIM) card in the desired mobile device 113 such as the international mobile subscriber identity (IMSI). In another example, the service subscription attribute is a unique identity of an application in the desired mobile device 113. The delivery agent 112 receives the device attribute and/or the service subscription attribute from the recipient mobile device 113 (at 103). The delivery agent 112 generates the key based on an encryption scheme, for example a cryptographic hash function, using one or more of the recipient identifier, the sender identifier, the device attribute, the service subscription attribute, an agent key that corresponds to the message sending system 111, and a nonce (at 104). The cryptographic hash function provides a key generation function (e.g., secure hash algorithm (SHA)-1 and (SHA)-2). The nonce may be a randomly-generated value provided by the recipient mobile device 113, the delivery agent 112, or the message sending system 111. The delivery agent 112 stores the nonce in a database to enable future generation of the key. The generated key is unique to the message sending system 111, the recipient mobile device 113, and the delivery agent 112. The delivery agent 112 sends the key to the message sending system 111 (at 105). According to one embodiment, the delivery agent 112 does not store the key (e.g., deletes the key). The message sending system 111 stores the key in a database (at 106).

Message Transmission

Figure 2:
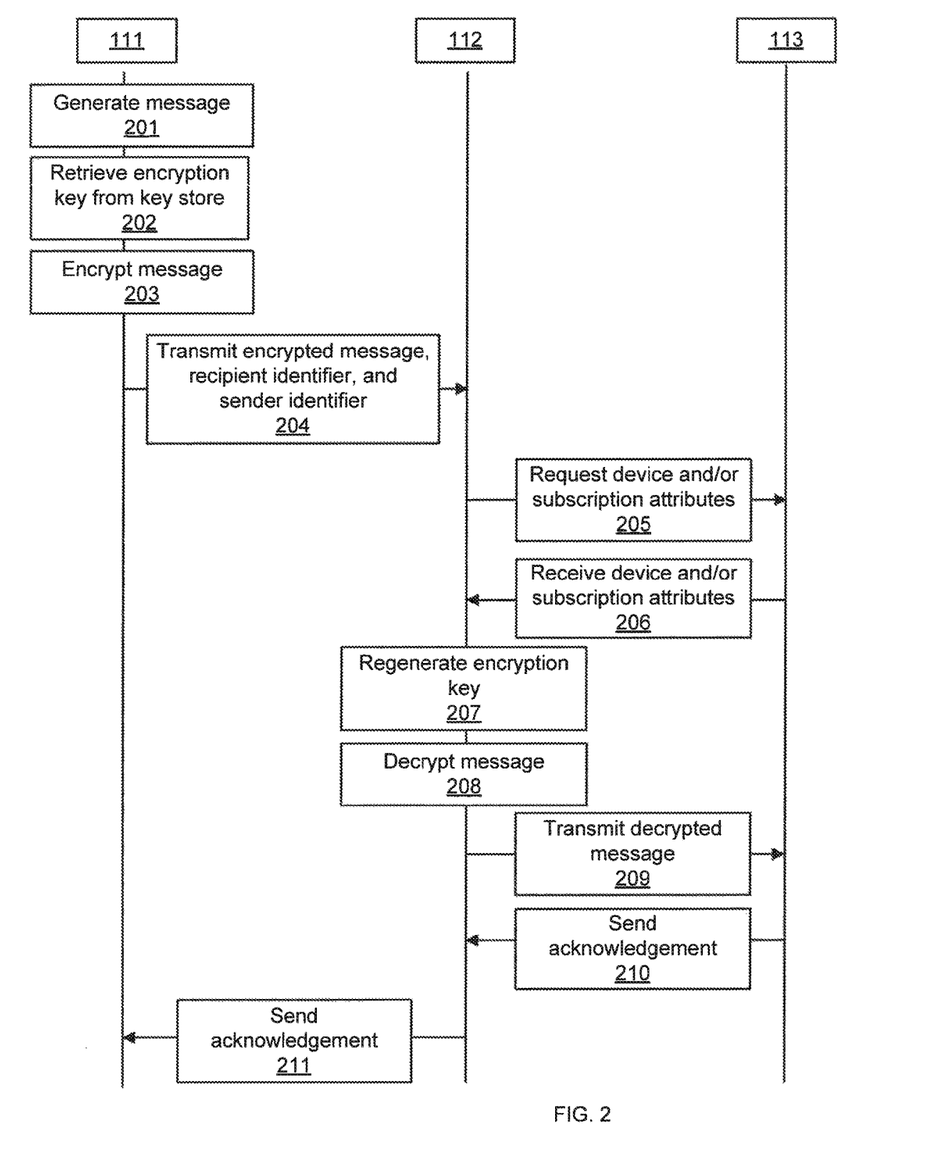
FIG. 2 illustrates an exemplary sequence for transmitting a message, according to one embodiment.

FIG. 2 illustrates an exemplary sequence for transmitting a message, according to one embodiment. The message sending system 111 initiates a message transmission function by generating a message that is intended for the mobile device 113 (at 201), retrieving a key associated with the mobile device 113 from the key store (at 202), and encrypting the message using the key and a pre-defined function (at 203). The pre-defined function may use a cipher suite that includes a combination of authentication, encryption, and message authentication code (MAC) functions. For example, the pre-defined function includes the advanced encryption standard (AES)-128, AES-256, and elliptic curve cryptography (ECC)-384. In one embodiment, the message sending system 111 encrypts the message using a key that is generated by the key generation process as described in FIG. 1. In another embodiment, the message sending system 111 encrypts the message using the key and a nonce that is shared between the message sending system 111 and the delivery agent 112. The message sending system 111 transmits the encrypted message, a recipient identifier of the recipient mobile device 113, and a sender identifier of the message sending system 111 to the delivery agent 112 (at 204).

The delivery agent 112 receives the encrypted message from the message sending system 111 and requests the device attribute and/or the service subscription attribute from the recipient mobile device 113 using the control plane of the recipient mobile device 113 (at 205). According to one embodiment, the delivery agent 112 requests a copy of the device attribute and/or the service subscription attribute that is similar and corresponds to the device attribute and/or the service subscription attribute that the delivery agent 112 requests from the recipient mobile device 113 (at 102) as described in FIG. 1. The delivery agent 112 receives the device attribute and/or the service subscription attribute from the recipient mobile device 113 (at 206). The delivery agent 112 regenerates the key based on an encryption scheme, for example a cryptographic hash function, using one or more of the recipient identifier, the sender identifier, the copy of the device attribute, the copy of the service subscription attribute, the agent key, and the nonce (at 207). According to one embodiment, the cryptographic hash function, the agent key, and/or the nonce are the same as that used in FIG. 1. The delivery agent 112 stores the nonce in a database for future regeneration of the key. The delivery agent 112 does not store the regenerated key, according to one embodiment.

The delivery agent 112 decrypts the message based on the pre-defined function and the regenerated key (at 208). According to one embodiment, the delivery agent 112 decrypts the message based on the regenerated key, the nonce, and the pre-defined function. The delivery agent 112 engages the control plane network of the recipient mobile device 113 to transmit the decrypted message to the recipient mobile device 113 (at 209). The control plane of the recipient mobile device 113 sends a positive or negative acknowledgement to the delivery agent 112 (at 210). The control plane of the recipient mobile device 113 sends a positive or negative acknowledgement based on whether the decrypted message is transmitted to the recipient mobile device 113. The delivery agent 112 further transmits the positive or negative acknowledgement to the message sending system 111 (at 211). In one embodiment, the acknowledgement is delivered using a signaling protocol (e.g., SS7 mobile application part (MAP) protocol). In another embodiment, the acknowledgement is delivered over a data transport connection with the recipient mobile device 113.

According to one embodiment, the present messaging system allows an organization (e.g., a bank) to send an encrypted message to a recipient phone number of a mobile device. In one embodiment, the recipient phone number is a mobile station international subscriber directory number (MSISDN). The MSISDN is a number that uniquely identifies a subscribing mobile device in a mobile network (e.g., a global system for mobile communications (GSM) network and a universal mobile telecommunications (UMTS) network). The MSISDN refers to a registered telephone number to a subscriber identity module (SIM) card in a mobile device. The present messaging system ensures that the recipient mobile phone is an actual mobile device and not a messaging gateway. The delivery agent of the present messaging system generates a key that is used to encrypt a message for a mobile device with a MSISDN to ensure that the message is secure. The delivery agent of the present messaging system further decrypts the encrypted message and delivers the decrypted message to the mobile device.

According to one embodiment, the present messaging system allows the sending system to store a key and encrypt a message with the key. The delivery agent of the present messaging system dynamically regenerates the key for message delivery by requesting an attribute from the mobile device. The present messaging system transmits the encrypted message through an intermediate system and decrypts the encrypted message. The present messaging system further delivers the decrypted message to the mobile device via a private signaling network (e.g., an SS7 mobile application part (MAP) protocol) used by a mobile operator.

According to one embodiment, the present messaging system generates a key that is associated with a recipient phone number of a recipient mobile device and stores the key in the message sending system. The present messaging system uses the key to encrypt a message for the recipient phone number of the recipient mobile device.

According to one embodiment, the present messaging system allows the message sending system and/or a user to register the user's phone number. The present messaging system generates a key that is associated with the user's phone on his/her mobile device. The present messaging system encrypts a message destined for a recipient phone number of a mobile device with the key that is associated with the recipient phone number.

In one embodiment, a first user and a second user register a first mobile phone number and a second mobile phone number respectively with a message sending system. For example, the first user and the second user register their phone numbers with Sovereign Bank to receive updates regarding their bank account activity. The message sending system registers the first phone number and the second phone number with a delivery agent. The delivery agent generates a key (e.g., key A) that is associated with the first phone number, and another key (e.g., key B) that is associated with the second phone number. The present messaging system encrypts a message (e.g., an account activity message) to the first phone number using key A to ensure that the encrypted message is sent securely to the first user.

According to one embodiment, the delivery agent does not store a key that is associated with a recipient phone number. A message sending system does not send the key to either the delivery agent or the recipient mobile device during message transmission. When the delivery agent receives an encrypted message, the delivery agent generates a duplicate of the key that is associated with the recipient phone number, decrypts the encrypted message based on the duplicated key and delivers the decrypted message to the recipient mobile device.

According to one embodiment, the message sending system or the delivery agent provides a pre-defined code. The present messaging system allows the delivery agent and a particular message sending system to share a particular code. The present messaging system allows the message sending system to register a recipient phone number and authorize a key generation request based on the pre-defined code. The message sending system registers the recipient phone number with the present messaging system to ensure that a message for a mobile device with the recipient phone number is only delivered to the mobile device.

According to one embodiment, the present messaging system extracts an international mobile subscriber identifier (IMSI) of the registered phone number and generates a key based on the IMSI. The IMSI uniquely identifies a mobile station, a home wireless network, and a home country of the home wireless network on the SIM card inserted into a mobile phone. The present messaging system generates a key that is associated with the registered phone number based on the IMSI and an encryption algorithm (e.g., the SHA256 encryption algorithm). The present messaging system generates a key that is unique to the registered phone number.

According to one embodiment, an organization requests a key for a recipient mobile device from a delivery agent using a message sending system. The interface between the organization and the message sending system is created based on various requirements. In one embodiment, the interface between the message sending system and the delivery agent is based on a communication protocol (e.g., the short message peer-to-peer (SMPP) 3.4 protocol). The delivery agent requests an attribute from a recipient mobile device and generates a key associated with the recipient mobile device. The generated key is unique to the SIM card in the recipient mobile device and the organization requesting the key. If a key is requested by a different organization for the same mobile device, the delivery agent generates a different key. The delivery agent returns the key to the message sending system of the requesting organization. In one embodiment, the delivery agent does not store the key. If a replacement key is required, the organization requests a new key for the recipient phone number so that the delivery agent generates the replacement key.

Figure 3:
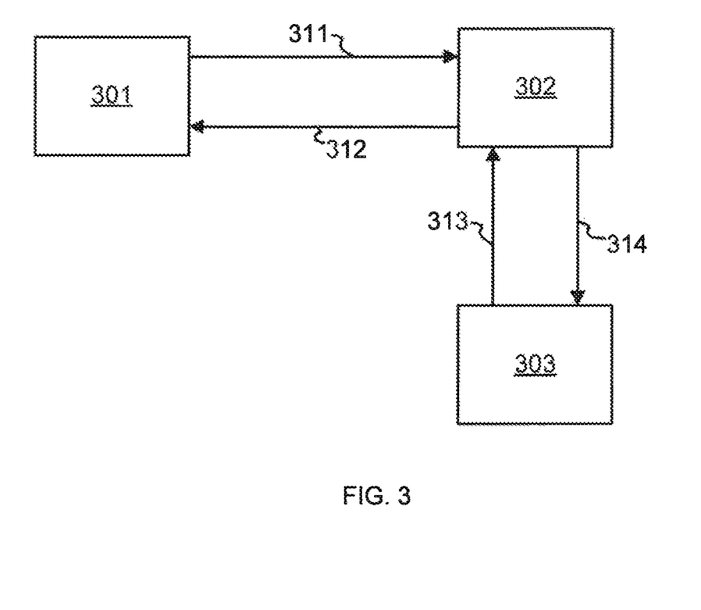
FIG. 3 illustrates an exemplary diagram for generating a key, according to one embodiment.

FIG. 3 illustrates an exemplary diagram showing how two independent organizations can request a key for a phone number, resulting in distinct and unrelated keys for the same phone number, according to one embodiment. A first organization 301 requests a key for a phone number with a message delivery agent (MDA) 302 (at 311). The MDA 302 acknowledges the request with a key (e.g., key A) (at 312). A second organization 303 requests a key for the same phone number with the MDA 302 (at 313). The MDA 302 acknowledges the request with another key (e.g., key B) (at 314). The MDA 302 uses unique codes assigned to organization 301 and 303 to ensure that generated key A and key B are unique and unrelated. In another embodiment, the MDA 302 does not store the keys. In another embodiment, the MDA 302 generates keys based on an encryption algorithm (e.g., secure hash algorithm SHA-256). In all embodiments, key A associated with the phone number requested by the first organization 301 is unique and different from key B associated with the same phone number requested by the second organization 302. It is understood that the present system can support any number of organizations without deviating from the scope of the present disclosure.

According to one embodiment, request/response messages can be delivered by SOAP or other application transports without affecting the above algorithm.

According to one embodiment, non-repudiation can be used in sending and receiving messages using the MDA 302. Non-repudiation has two parts: 1) the receiver has proof that the sender has sent the message, and 2) the sender has proof that the recipient received the message. Such a protocol may also be used on communications initiated from both the Internet and mobile directions which may result in the four cases described below.

For messages sent from the Internet side to the mobile side:

Example 1—Non-Repudiation of Sender

In this exemplary case, the sender uses his own identity along with the key associated with the recipient to encrypt the message. Only the sender who previously requested the key from the MDA 302 using that identity has that unique key. The MDA 302 on behalf of the mobile user decrypts the message. If either the sender's identity or the key is incorrect, the message will not decrypt correctly and the MDA 302 will not deliver the message further. If the message decrypts correctly, then that proves to the MDA 302 that only the sender who has the key could have encrypted it. The encrypted message could further carry a code word known only to the sender and recipient in the message delivered over the SS7 link, so that the end-user also knows that the message came from the Internet-based business partner. Since the MDA 302 ensures proper delivery directly to the mobile user, that code word is not easily compromised.

Example 2—Non-Repudiation of Receiver

In this case, the MDA 302 can communicate directly with the mobile device to deliver the message. This method requires the MDA 302 to verify the identity of the mobile device before sending the message. The method ensures such verification of identity by requesting parameters that belong only to that mobile and using those parameters to actually reach that mobile device. The SS7 signaling messages used are routed directly and not stored by intermediaries. The method also requires the mobile device to send an acknowledgement message confirming receipt of the message. That acknowledgement is sent back to the sending Internet device as confirmation.

For messages sent from the mobile side to the Internet side:

Example 3—Non-Repudiation of Sender

Similar to Example 2 above, the MDA 302 can receive messages from the mobile device directly over SS7. The MDA 302 can provide acknowledgement to the mobile device. However, if someone knows the mobile parameters, the algorithm and the Internet identity, such message can be compromised. In order to ensure that the message came from the correct mobile device, MDA 302 follows a particular method. This method uses call-backs to ensure that the communication is always initiated by the MDA 302 because the MDA 302 can ensure that a direct SS7 signaling path is established through a valid operator to the valid mobile handset. The mobile is limited to sending an alert to the MDA 302 indicating that it needs to take an action. The MDA establishes contact to the MDA 302 as described in Example 1. If the mobile responds to the call back, the MDA 302 can then proceed to alert the Internet user that the mobile wishes to engage. The MDA 302 can then use the target Internet recipient identity and parameters from the mobile device to encrypt the alert message. The Internet device is then able to decrypt the message using the key stored for that mobile device associated with its parameters. If the messages decrypts correctly, then the Internet device knows the alert was delivered by the MDA 302. The Internet device can then initiate a conversation with the mobile using the method as described in Example 1.

Example 4—Non-Repudiation of Receiver

In this case, the message from the mobile to the Internet user may be acknowledged in the reverse direction. The Internet user can encrypt the acknowledgement message similar to Example 1 and this acknowledgement can be delivered securely as described before. Once the acknowledgement is received by the mobile user, the MDA 302 will know that the alert message was received correctly. It is then ready to respond to initiation of the new conversation by the internet sender (Example 1).

Therefore, in many cases the message initiation from mobile to Internet side is very limited, and all risky communications are initiated from the Internet side where the user has better control.

Figure 4:
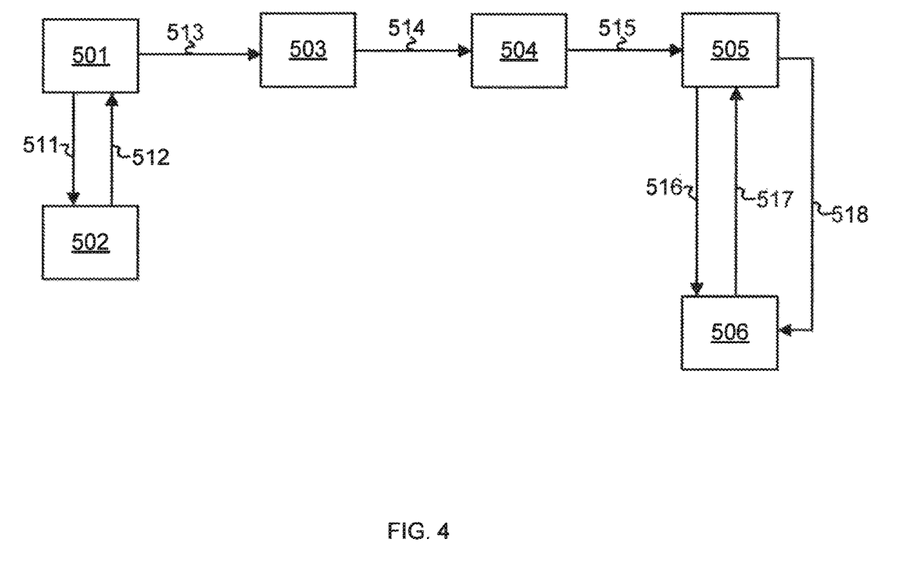
FIG. 4 illustrates an exemplary diagram for sending a secure message to a mobile device, according to one embodiment.

FIG. 4 illustrates an exemplary diagram for sending a secure message to a mobile device, according to one embodiment. An organization 501 (e.g., a message sending system) sends its key associated with a phone number on a recipient mobile device 506 to an encryption tool 502 (at 511). The encryption tool 502 may be a part of the organization 501 or may be an external component. The encryption tool 502 encrypts a message for the recipient mobile device 506 based on the key and an encryption algorithm (e.g., the advanced encryption standard (AES)-128) (at 512). The organization 501 forwards the encrypted message and a code associated with the organization 501 to a message aggregator 503 (at 513). The message aggregator 503 may include intermediate servers that form an email or messaging network that receives and transmits an encrypted message that includes an email. The message aggregator 503 may also include a network of short service message centers (SMSC) that receives and transmits an SMS. The message aggregator 503 forwards the encrypted message, the code, and the recipient phone number to a message center 504 (at 514). According to one embodiment, the message aggregator 503 forwards the encrypted message and the enterprise code to the message center 504 via different transport mechanisms such as a short message peer-to-peer (SMPP) connection. In another embodiment, the message aggregator 503 transmits the enterprise code to the message center 504 via a SMPP vendor specific type-length-value (TLV) mechanism.

The message center 504 transmits the encrypted message to a delivery agent 505 (at 515). The delivery agent 505 sends a request to the recipient mobile device 506 to retrieve an attribute of the mobile device 506 before sending the encrypted message (at 516). If the recipient mobile device 506 is active and ready to receive a message, the delivery agent 505 retrieves an attribute of the recipient mobile device 506, for example, a SIM card attribute (at 517). The delivery agent 505 regenerates the key based on the retrieved attribute of the recipient mobile device 506. The processes 513-515 provide a network delivery path from the organization 501 to the delivery agent 505. Hence, the key does not have to be stored along the network delivery paths 513-515. This ensures that if a node in the message aggregator 503 or the message center 504 is compromised, the key is not compromised. According to one embodiment, the retrieved attribute is the IMSI of the recipient mobile device 506. If the IMSI has not changed (i.e., user of the recipient mobile device 506 has not moved to a different mobile operator), the delivery agent 505 decrypts the encrypted message based on the duplicated key and delivers the decrypted message to the recipient mobile device 506 over a mobile control signaling network (at 518). It is understood that the delivery agent 505 can deliver the decrypted message to the recipient mobile 506 using a telephone signaling protocol, without deviating from the scope of the present disclosure. For example, the delivery agent 505 delivers the decrypted message to the recipient mobile device 506 over a Signaling System No. 7 (SS7) network. According to one embodiment, the delivery agent 505 does not store the decrypted message after delivering the decrypted message. If the recipient mobile device 506 is not available for message delivery or if the message is not acknowledged by the mobile control signaling network, the delivery agent 505 retains the encrypted message in an encrypted state for future delivery. For example, the recipient mobile device 506 is turned off, or does not have network coverage. In another example, the mobile control signaling network does not save the message after a pre-defined time period. The mobile control signaling network provides an acknowledgement for the delivered message and sends the acknowledgment to the delivery agent 505.

Figure 5:
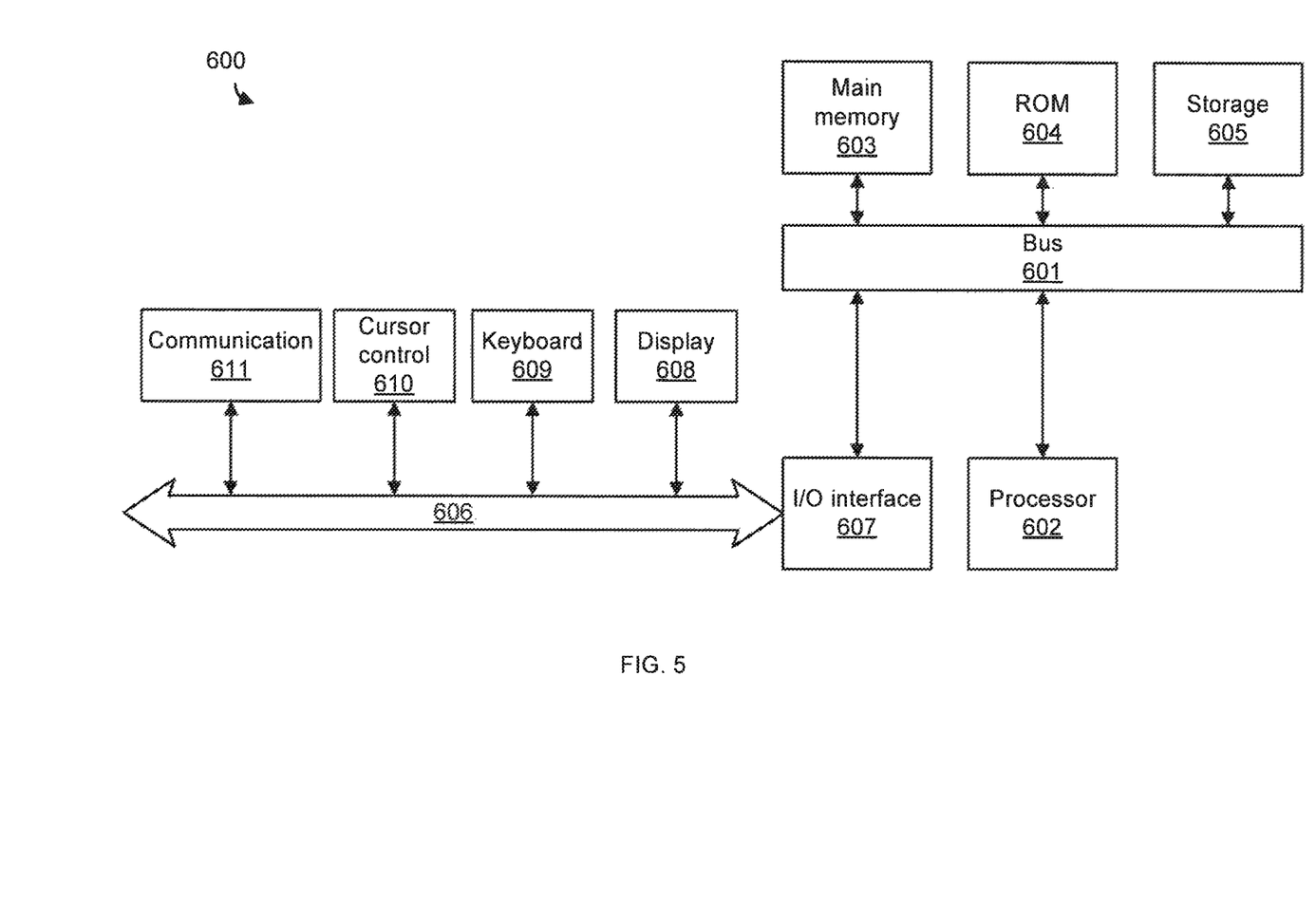
FIG. 5 illustrates an exemplary computer architecture that may be used for the present system, according to one embodiment.

FIG. 5 illustrates an exemplary computer architecture that may be used for the present system, according to one embodiment. The exemplary computer architecture may be used for implementing one or more components described in the present disclosure including, but not limited to, the present system. One embodiment of architecture 600 includes a system bus 601 for communicating information, and a processor 602 coupled to bus 601 for processing information. Architecture 600 further includes a random access memory (RAM) or other dynamic storage device 603 (referred to herein as main memory), coupled to bus 601 for storing information and instructions to be executed by processor 602. Main memory 603 also may be used for storing temporary variables or other intermediate information during execution of instructions by processor 602. Architecture 600 may also include a read only memory (ROM) and/or other static storage device 604 coupled to bus 601 for storing static information and instructions used by processor 602.

A data storage device 605 such as a magnetic disk or optical disc and its corresponding drive may also be coupled to architecture 600 for storing information and instructions. Architecture 600 can also be coupled to a second I/O bus 606 via an I/O interface 607. A plurality of I/O devices may be coupled to I/O bus 606, including a display device 608, an input device (e.g., an alphanumeric input device 609 and/or a cursor control device 610).

The communication device 611 allows for access to other computers (e.g., servers or clients) via a network. The communication device 611 may include one or more modems, network interface cards, wireless network interfaces or other interface devices, such as those used for coupling to Ethernet, token ring, or other types of networks.

The above example embodiments have been described hereinabove to illustrate various embodiments of implementing a system and method for transmitting a secure message over a signaling network. Various modifications and departures from the disclosed example embodiments will occur to those having ordinary skill in the art. The subject matter that is intended to be within the scope of the disclosure is set forth in the following claims.

We claim:
1. A method, comprising:
   providing a first request to a recipient mobile device for one or more attributes associated with a phone number for the recipient mobile device;

receiving the one or more attributes from the recipient mobile device after providing the first request;

generating a key based on the one or more attributes received from the recipient mobile device;

receiving an encrypted message for the recipient mobile device, wherein the encrypted message is encrypted based on the key;

providing a second request to the recipient mobile device for the one or more attributes of the recipient mobile device before delivering the encrypted message to the recipient mobile device;

receiving the one or more attributes from the recipient mobile device after providing the second request;

regenerating the key based on the one or more attributes received from the recipient mobile device;

decrypting the encrypted message based on the regenerated key to generate a decrypted message; and delivering the decrypted message to the recipient mobile device, wherein the decrypted message is an SMS message having a clear text format.

2. The method of claim 1, wherein providing the request for the one or more attributes comprises requesting one or more of a sender identifier corresponding to a message sending system and a recipient identifier of the recipient mobile device.

3. The method of claim 2, further comprising generating the key based on one or more of the sender identifier, the recipient identifier, an agent key, and a nonce.

4. The method of claim 1, further comprising storing the key at a message sending system.

5. The method of claim 1, wherein the one or more attributes comprises one or more of a device attribute and a service subscription attribute.

6. The method of claim 1, further comprising regenerating the key based on one or more of a sender identifier of a message sending system, a recipient identifier of the recipient mobile device, an agent key, and a nonce.

7. The method of claim 1, further comprising receiving an acknowledgement from the recipient mobile device.

8. The method of claim 1, further comprising requesting keys for the phone number based on a sender identifier corresponding to a customer of the message sending system.

9. The method of claim 1, further comprising authorizing the request for the one or more attributes based on a code corresponding to a message sending system.

10. The method of claim 1, further comprising receiving the encrypted message for the recipient mobile device, wherein the encrypted message is encrypted based on the key and a nonce.

11. The method of claim 1, further comprising decrypting the encrypted message based on the regenerated key and a nonce.

12. A system, comprising:
a delivery agent that provides a first request to a recipient mobile device for one or more attributes associated with a phone number from the recipient mobile device, wherein the delivery agent receives the one or more attributes from the recipient mobile device after providing the first request;

wherein the delivery agent generates a key based on the one or more attributes received from the recipient mobile device, wherein the delivery agent receives an encrypted message for a recipient mobile device, wherein the encrypted message is encrypted based on the key, wherein the delivery agent provides a second request to the recipient mobile device for the one or more attributes of the recipient mobile device before delivering the encrypted message to the recipient mobile device, wherein the delivery agent receives the one or more attributes from the recipient mobile device after providing the second request, wherein the delivery agent regenerates the key based on the one or more attributes received from the recipient mobile device, wherein the delivery agent decrypts the encrypted message based on the regenerated key to generate a decrypted message, and wherein the delivery agent delivers the decrypted message to the recipient mobile device, wherein the decrypted message is an SMS message having a clear text format.

13. The system of claim 12, wherein the delivery agent receives a sender identifier of a message sending system and a recipient identifier of the recipient mobile device from the message sending system.

14. The system of claim 13, wherein the delivery agent generates the key based on one or more of the sender identifier, the recipient identifier, an agent key, and a nonce.

15. The system of claim 13, wherein the message sending system stores the key.

16. The system of claim 12, wherein the one or more attributes comprises one or more of a device attribute and a service subscription attribute.

17. The system of claim 12, wherein the delivery agent regenerates the key based on one or more of a sender identifier of a message sending system, a recipient identifier of the recipient mobile device, an agent key, and a nonce.

18. The system of claim 12, wherein the delivery agent receives an acknowledgement from the recipient mobile device.

19. The system of claim 12, wherein the delivery agent requests keys for the phone number based on a sender identifier corresponding to a customer of the message sending system.

20. The system of claim 12, wherein the delivery agent authorizes the request for the one or more attributes based on a code corresponding to a message sending system.

21. The system of claim 12, wherein the delivery agent receives the encrypted message for the recipient mobile device, wherein the encrypted message is encrypted based on the key and a nonce.

22. The system of claim 12, wherein the delivery agent decrypts the encrypted message based on the regenerated key and a nonce.

23. The system of claim 12, wherein a user identity from a sender mobile device is used to encrypt the encrypted message received by the delivery agent.

24. The system of claim 23, wherein the encrypted message carries a code word known only to a sender of the sender mobile device and a recipient of the recipient mobile device.

25. The system of claim 12, wherein the delivery agent requests one or more identification parameters from the recipient mobile device before delivering the decrypted message to the recipient mobile device.

26. The system of claim 25, wherein the delivery agent verifies the one or more identification parameters received from the recipient mobile device and delivers the decrypted message to the recipient mobile device using said identification parameters.

27. The system of claim 12, wherein after receiving the one or more attributes from the recipient mobile device, the delivery agent sends an acknowledgement to the recipient mobile device.

28. The system of claim 12, wherein the delivery agent receives the one or more attributes from the recipient mobile device over SS7 protocol.

\* \* \* \* \*